(12) United States Patent
Aydt

(10) Patent No.: US 6,371,260 B2
(45) Date of Patent: Apr. 16, 2002

(54) COMBINED DISK AND DRUM BRAKE

(75) Inventor: Guenter Aydt, Backnang (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/746,075

(22) Filed: Dec. 26, 2000

(30) Foreign Application Priority Data

Dec. 24, 1999 (DE) .......................................... 199 63 031

(51) Int. Cl.[7] .............................................. F16D 65/10
(52) U.S. Cl. .................................. 188/218 A; 188/70 R
(58) Field of Search ...................... 188/106 F, 218 A, 188/18 A, 70 R, 71.1

(56) References Cited

U.S. PATENT DOCUMENTS

| | | | | |
|---|---|---|---|---|
| 1,887,478 A | * | 11/1932 | Blazek | 188/218 A |
| 3,827,534 A | * | 8/1974 | Brooks | 188/68 |
| 4,005,768 A | * | 2/1977 | Bubnash et al. | 188/218 A |
| 4,230,208 A | * | 10/1980 | Gale | 188/73.1 |
| 4,313,528 A | | 2/1982 | Ito | 188/218 A |
| 5,180,037 A | | 1/1993 | Evans | |
| 5,305,861 A | * | 4/1994 | Kobayashi | 188/328 |
| 5,529,149 A | * | 6/1996 | Johannesen et al. | 188/70 R |
| 6,296,086 B1 | * | 10/2001 | Reuber et al. | 188/218 A |

FOREIGN PATENT DOCUMENTS

| | | |
|---|---|---|
| DE | 38 24 917 | 1/1990 |
| JP | 6249273 | 9/1994 |

* cited by examiner

Primary Examiner—Christopher P. Schwartz
Assistant Examiner—Benjamin A Pezzlo
(74) Attorney, Agent, or Firm—Crowell & Moring LLP

(57) ABSTRACT

A combined disk and drum brake has two friction rings and an inside shoe brake, where the inside friction ring exhibits an annular channel. This annular channel serves to collect and drain water or water droplets entering into the brake disk, so that this liquid is drained over a gap between the outer friction ring and a shielding plate. Furthermore, the air guide channel is designed as a separate, water-draining channel in the brake disk.

5 Claims, 2 Drawing Sheets

COMBINED DISK AND DRUM BRAKE

BACKGROUND AND SUMMARY OF THE DISCLOSURE

This application claims the priority of German Patent Application No. 199 63 031.3, filed in Germany, Dec. 24, 1999, the disclosure of which is expressly incorporated by reference herein.

The invention relates to a combined disk and drum brake with an internally ventilated brake disk.

The German Patent Document DE 38 24 917 A1 discloses a brake drum with a brake ring, provided with a peripheral recess, into which a steel plate projects so that splashwater ingress into the drum is prevented and splashwater egress is improved. Furthermore, U.S. Pat. No. 4,313,528 discloses an internally ventilated disk brake with an Inside shoe brake, which exhibits on an inside friction ring an annular groove, whose base exhibits passage openings to the air guide channels between the friction rings of the brake disk, in order to protect against water entering into the inside shoe brake. To drain the water, a peripheral collar is laid down by a shielding plate and bent in the direction of the annular groove.

An object of the invention is, in the case of an internally ventilated brake disk with an inside shoe brake, to avoid splashwater, water or the like from penetrating onto the running surfaces of the inside shoe brake and to make it possible to specifically lead in and out the water both inside and outside the brake disk with simple means.

This object is achieved according to preferred embodiments of the invention by providing a combined disk and drum brake with an internally ventilated brake disk, comprising:

an inside and an outside friction ring, a peripheral water guide plate at a shielding plate, and an inside shoe brake arranged in a brake drum, wherein the inside friction ring exhibits an annular channel which has a contracted groove opening opposite a base of the channel, wherein air guide channels of the brake disk form water drainage channels, which are separated relative to a water draining interspace, defined by the shielding plate and a friction ring surface, and wherein the water guide plate projects into the annular channel and is arranged in such a manner at an angle to the annular channel that in an approximately vertical water ingress position the guide plate is at an acute angle relative to the channel base and at the same time in an approximately vertical water egress position the guide plate forms a runoff slope.

In contrast to the separate water accommodation and common water drainage of water—splashwater and the like—, penetrating into the brake disk, over air guide channels in an internally ventilated brake disk as the water drainage channels, the invention provides that the water drains toward the outside over two separate channels or through the air guide channels of the internally ventilated brake disk and over an interspace, formed by a shielding plate to the brake disk. Thus, the result in the case of the accumulation of large quantities of splashwater or liquids is better and faster drainage of water to the outside over the two separate channels or the interspace without loading the inside shoe brake with splashwater.

The air guide channels run between the two friction rings of the internally ventilated brake disk approximately parallel to the friction ring walls, where an upper orifice opening of the air guide channels or the water drainage channels lies in the faces of the friction rings, and the bottom orifice opening of the air guide channels is arranged at a 90° angle relative to the drum wall in the region or in the direction of the brake drum and extends from here in the shape of an arc to the other straight air guide channel between the friction rings.

Due to these orifice openings, which belong to the air guide channels and are arranged separately from the orifice slit of the shielding plate, splashwater or liquid can drain immediately by circumventing the annular channel.

Other objects, advantages and novel features of the present invention will become apparent from the following detailed description of the invention when considered in conjunction with the accompanying drawings.

DETAILED DESCRIPTION OF THE DRAWINGS

Figure 1:
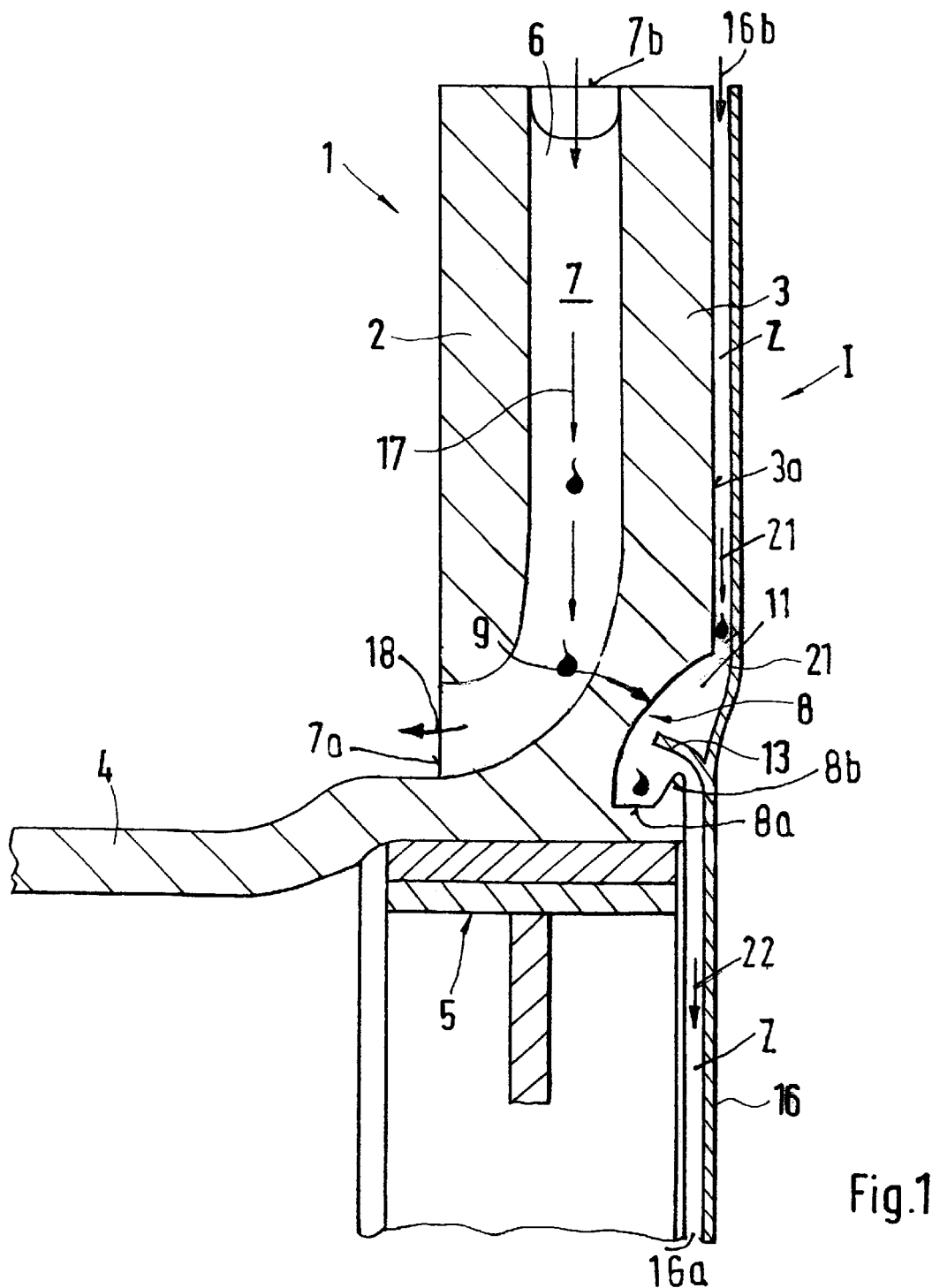
FIG. 1 is a cross section of an upper half of a brake disk with one upper orifice opening of an air channel and a shielding plate, whose side defines an interspace, and in a water ingress position.

An internally ventilated brake disk 1 comprises in essence two friction rings 2, 3, which are connected to a brake drum 4. Said brake drum houses an inside shoe brake 5. The two friction rings 2, 3 exhibit radial cross ribs 6 over the periphery; said ribs form the air guide channels 7 between the friction rings 2, 3.

The one inside friction ring 3 of the brake disk 1 is provided with an annular channel 11, designed as a groove 8, which is arranged coaxially to the brake drum 4. The side wall of this channel 11 form a chute 8a, the so called water drainage chute. This annular channel 11 exhibits an arched base 9, which extends from a friction ring surface 3a to the chute 8a, which exhibits a bordering rim 8b relative to the interspace or gap Z. The chute 8a is provided on the periphery and exhibits a base at right angles to the friction rings 2, 3.

The water, which has collected in the chute 8a, in position II (FIG. 2) can drain quickly through the arched base 9 of the annular channel 11. The brake disk 1 is protected by a shielding plate 16, which is arranged at a distance from the inside friction ring 3. The shielding plate 16 has a water guide plate 13, a so called collar, which projects into the annular channel 11.

Figure 2:
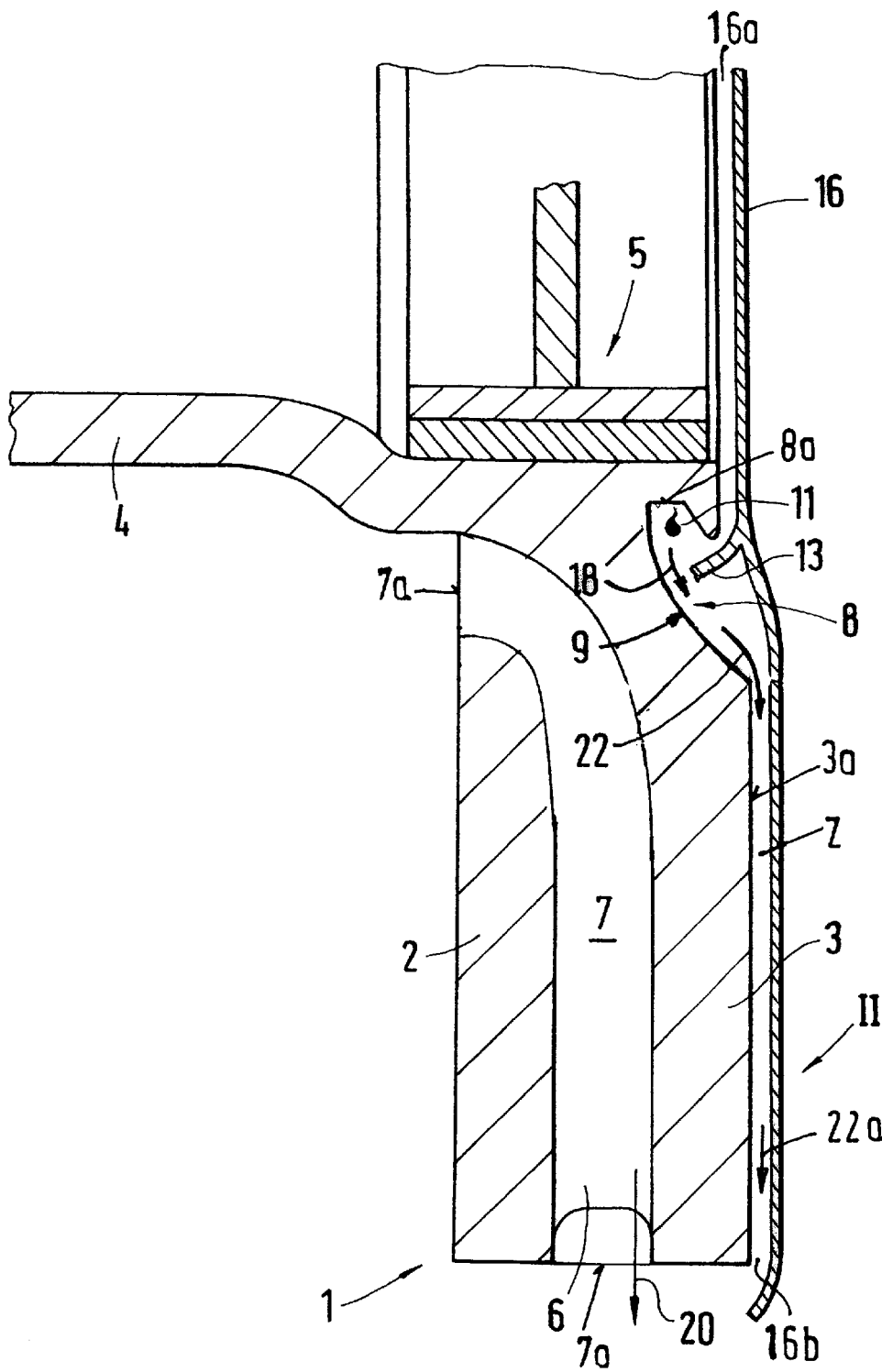
FIG. 2 is a cross section of a bottom half of a brake disk with a bottom orifice opening of the air channels or water drainage channels in a water egress position.

The water guide plate 13 slopes at an angle, as is quite evident from FIGS. 1 and 2, and extends up to the vicinity of the base 9 of the annular channel 11. The air guide channels 7 are separated from the annular channel 11. That is, the outlet or inlet openings, like the orifice opening 7a or 7b and 7b or 7a of the air guide channels 7, are separate from the orifice slits 16a and 16b.

FIG. 1 depicts a water ingress position I. That is, the water enters, for example, in a vertical position of the brake disk 1. However, water or water droplets and the like can get into the air guide channels 7 in other positions. The water flows in the direction of the arrow 17 through the air guide channels 7 and from here in the direction of arrow 18 or 20 through the orifice openings 7a or 7b to the outside. The air guide channels 7 are curved in the region of the orifice opening 7a and run in a straight line relative to the orifice 7b between the friction rings 2, 3 and parallel to the same.

The region Z between the shielding plate 16 and the inside friction ring 3, incoming water or water droplets flow in the direction of the arrow 21 into the annular channel 11 and into the chute 8*a* and then in the direction of the arrow 22, 22*a* directly to the outside.

Thus, the result of the deposited water guide plate 13 is a labyrinth-like shielding relative to the inside shoe brake 5 and, moreover, a water guide to the outside that takes place separately from the air guide channel 7. The annular channel 11 can exhibit a cross section, which can be designed, for example, so as to be triangular, U shaped, and semicircular so that the incoming water can be drained without any impediment to the outside in a very short period of time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Combined disk and drum brake assembly comprising:
    a brake drum,
    first and second friction rings surrounding the brake drum, and
    a shielding plate with a protruding water guide plate section, said shielding plate extending adjacent the first friction ring and the brake drum,
    wherein the first friction ring has an annular channel with an opening facing the shielding plate,
    wherein air guide channels extend between the friction rings and open to a water guide channel separated from the annular channel in the first friction ring.

2. Combined disk and drum brake with an internally ventilated brake disk, comprising:
    an inside and an outside friction ring,
    a peripheral water guide plate at a shielding plate, and
    an inside shoe brake arranged in a brake drum,
    wherein the inside friction ring exhibits an annular channel has a contracted groove opening, opposite the base of the channel,
    wherein the air guide channels of the brake disk form water drainage channels, which are separated relative to a water draining interspace, defined by the shielding plate and a friction ring surface, and
    wherein the water guide plate projects into the annular channel and is arranged in such a manner at an angle to the annular channel that in an approximately vertical water ingress position the guide plate is at an acute angle relative to the channel base and at the same time in an approximately vertical water egress position the guide plate forms a runoff slope.

3. Combined disk and drum brake, as claimed in claim 2, wherein the water drainage channels in the air guide channels exhibit an internal, arched water outlet, whose orifice opening faces the brake drum and additionally is arranged at a 90° angle.

4. Combined disk and drum brake, as claimed in claim 2, wherein the annular channel exhibits an arched base, which extends from the friction ring surface to a chute, which is defined by an outer rim.

5. Combined disk and drum brake, as claimed in claim 3, wherein the annular channel exhibits an arched base, which extends from the friction ring surface to a chute, which is defined by an outer rim.

* * * * *